(12) United States Patent
Hinnant, Jr.

(10) Patent No.: US 8,346,415 B1
(45) Date of Patent: Jan. 1, 2013

(54) AUTONOMOUS UNDERWATER NAVIGATION

(75) Inventor: Harris O. Hinnant, Jr., Seattle, WA (US)

(73) Assignee: The Boeing Company, Chicago, IL (US)

( * ) Notice: Subject to any disclaimer, the term of this patent is extended or adjusted under 35 U.S.C. 154(b) by 614 days.

(21) Appl. No.: 12/605,326

(22) Filed: Oct. 24, 2009

(51) Int. Cl.
*G01C 21/00* (2006.01)
*G01V 8/00* (2006.01)

(52) U.S. Cl. .......... 701/21; 701/300; 701/468; 701/523; 701/500; 702/5

(58) Field of Classification Search .................. None
See application file for complete search history.

(56) References Cited

U.S. PATENT DOCUMENTS

| | | | | |
|---|---|---|---|---|
| 4,996,673 | A * | 2/1991 | Brooke | 367/131 |
| 6,819,984 | B1 * | 11/2004 | Bedckman et al. | 701/21 |
| 6,941,226 | B2 * | 9/2005 | Estep | 701/468 |
| 7,307,585 | B2 | 12/2007 | Hinnant et al. | |
| 8,098,545 | B2 * | 1/2012 | Rhodes et al. | 367/131 |
| 2004/0022129 | A1 * | 2/2004 | McGeever, Jr. | 367/128 |
| 2007/0006472 | A1 * | 1/2007 | Bauch | 33/355 R |
| 2008/0298173 | A1 * | 12/2008 | Guigne | 367/16 |
| 2009/0095209 | A1 * | 4/2009 | Jamieson | 114/312 |
| 2009/0141591 | A1 * | 6/2009 | Basilico | 367/128 |
| 2012/0014220 | A1 * | 1/2012 | DePasqua | 367/88 |

OTHER PUBLICATIONS

A Survey of Practical Issues in Underwater Networks, Jim Partan, Jim Kurose, Brian N. Levine, University of Massachusetts and Woods Hole Oceanographic Institution, 2006 ACM.
Persistent Littoral Undersea Surveillance Network, a program to develop an acoustic undersea network for littoral and harbor area monitoring. http://mseas.mit.edu/archive/PLUSNet/index_PLUSNet.html.
A Means to Networked Persistent Undersea Surveillance, Mark Stewart, 2006 Submarine Technology Symposium.

* cited by examiner

*Primary Examiner* — Michael J. Zanelli
(74) *Attorney, Agent, or Firm* — Caven & Aghevli LLC

(57) ABSTRACT

Systems and methods for autonomous underwater navigation are disclosed. In one embodiment, a system for autonomous underwater navigation comprises an underwater communication network, at least one master controller node coupled to the underwater communication network, at least one network docking node coupled to the underwater communication network, and at least one submersible vehicle for underwater mapping at least a portion of a floor of a body of water. The submersible vehicle comprises a geolocation module to establish a geographic reference for at least one location in the underwater geographic region and an image collection module to collect images of an underwater geographic region proximate the geographic reference.

20 Claims, 7 Drawing Sheets

AUTONOMOUS UNDERWATER NAVIGATION

BACKGROUND

Underwater navigation has applications in civil and military contexts. For example, underwater scientific research may use underwater vehicles to navigate areas of the ocean floor. Similarly, military applications may use underwater vehicles to navigate areas of the ocean floor.

Many existing underwater navigation systems utilize active navigation systems, e.g., acoustic sensors, which are subject to noise and interference from other objects in the water, or from movement of the water itself. Passive navigation systems, e.g., the global positioning system (GPS) are potentially subject to jamming and also have limited penetration in an underwater environment. Accordingly, systems and methods for autonomous underwater navigation may find utility.

SUMMARY

Embodiments of systems and methods in accordance with the present disclosure may provide autonomous underwater navigation. More specifically, some embodiments described herein may include submersible vehicles that cooperate with communication networks to develop a map of portions of the floor in regions surrounding the underwater network. The communication network may include underwater communication and power cabling. One or more network docking nodes may be incorporated into the underwater network such that one or more submersible vehicles can establish a communication connection with the communication network. One or more master controller nodes may be coupled to the underwater network. The submersible vehicle(s) may comprise a geolocation module and an image collection module.

In operation, one or more submersible vehicles generate images of the underwater geographic region proximate a network docking node to which it may be coupled. The submersible vehicle associates a geolocation with features associated with and comprising the images. The submersible vehicle may then dock at the network docking node and transmit the images and the geolocation information to the master controller via the communication network. The master controller may then process the images from the submersible vehicle(s) to develop a comprehensive map of underwater geographic regions proximate network docking nodes in the communication network. The entire map, or portions thereof, may be provided to submersible vehicles when the submersible vehicles couple with a docking node. The submersible vehicle(s) can use the map for autonomous underwater navigation. By way of example, in some embodiments the submersible may implement a process of identifying in the image database geolocated features along the desired navigation corridor that, as the corridor is navigated, are imaged anew to provide a precise update to the navigation system, refining the map to drive errors out of the navigation solution. In some embodiments the submersible may use technologies such as inertial navigation, aided navigation, transfer alignment of navigation systems, Global Navigation Satellite Systems, optical cameras and the like coupled with a network grid providing power and communications capability, to perform autonomous navigation for long term underwater operations.

Thus, in one embodiment, a submersible vehicle for autonomous underwater navigation of at least a portion of a floor of a body of water comprises a geolocation module to establish a geographic reference for at least one location in the underwater geographic region and an image collection module to collect images of an underwater geographic region proximate the geographic reference. In some embodiments, the geolocation module typically may be implemented as a Global Satellite Navigation System receiver, and it provides a position (geolocation) based on, for example, the WGS84 coordinate system used by the Global Positioning System. This precise position is used to update the navigation system and drive to zero (or as close as possible) the error in the navigation solution it provides. The embodiment here then transfers that precision to underwater floor features identified in the underwater imagery. Completion of this process results in a precisely geolocated grid of underwater floor features supporting navigation through imaging of the floor. In featureless areas markers may be deployed as part of network grid installation to provide the desired features. The geolocation module may then be used as a backup system in the event an autonomous submersible vehicle loses itself off the grid, in which case it surfaces and uses the module to fix its position and then navigates back into the known area.

In another embodiment, a system for autonomous underwater navigation, comprises a communication network, at least one master controller node coupled to the communication network, at least one network docking node coupled to the communication network, and at least one submersible vehicle to map at least a portion of a floor of a body of water. The submersible vehicle comprises a geolocation module to establish a geographic reference for at least one location in the underwater geographic region, and an image collection module to collect images of an underwater geographic region proximate the geographic reference.

In some embodiments, the geolocation and imaging processes are stochastic in the sense the error in geolocation and image feature identification is probabilistic and can be modeled and estimated using appropriate algorithms such as a Kalman filter. The master controller node therefore assimilates all the image data from submersibles in the network, image data consisting of the image and the estimated navigation accuracy with which it has been geolocated. From this data, and using stochastic and image processing methods, the master controller assembles a map of the known (i.e., imaged) network area together with the best estimate of the accuracy with which area features have been geolocated. This process improves over time and with repetition. The master controller may then use this database to task the various network submersibles with different missions, providing them the necessary mission data.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

Embodiments of methods and systems in accordance with the teachings of the present disclosure are described in detail below with reference to the following drawings.

DETAILED DESCRIPTION

Systems and methods for autonomous underwater navigation are described herein. Specific details of certain embodiments are set forth in the following description and in the Figures to provide a thorough understanding of such embodiments. One skilled in the art will understand, however, that alternate embodiments may be practiced without several of the details described in the following description.

Figure 1:
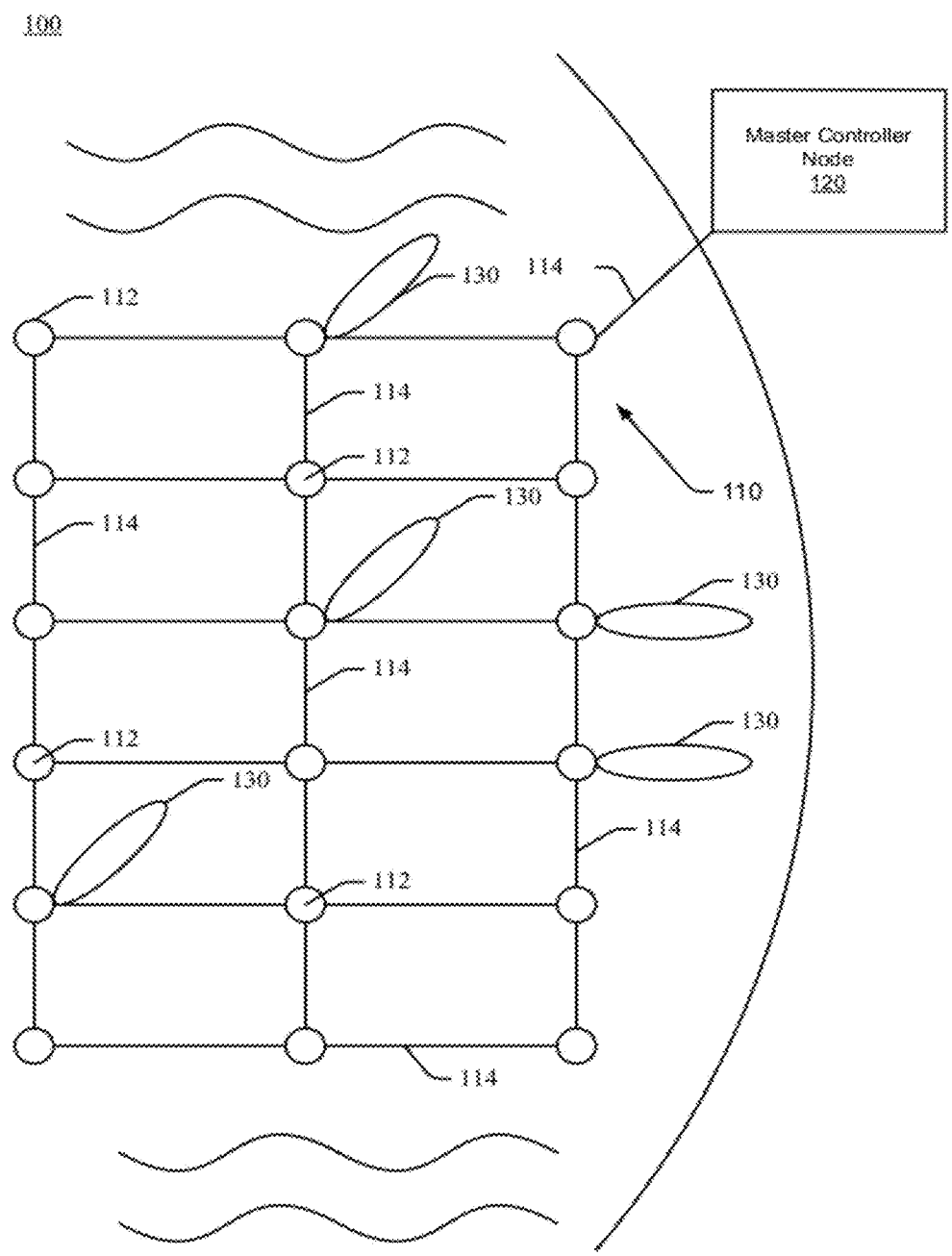
FIG. 1 is a schematic illustration of a system for autonomous underwater navigation, according to embodiments.

FIG. 1 is a schematic illustration of a system for autonomous underwater navigation, according to embodiments. In the embodiment depicted in FIG. 1, the system 100 comprises an underwater communication network 110. The communication network comprises a plurality of docking stations 112 coupled by a plurality of communication links. 114. At least one master controller node 120, which may be above water, is coupled to the underwater network 110 via a communication link 114. A number of submersible vehicles 130 may be coupled to the communication network 100 via the docking stations 112.

While the communication network depicted in FIG. 1 is illustrated as a grid network, the particular configuration of the network 110 is not critical. The communication network 110 may be implemented in a grid, in one or more rings, or in a linear network. Similarly, the particular operating protocol of the communication network 110 is not critical. In some embodiments, network 110 may implement electronic communication pursuant to existing communication protocols. By way of example, the communication network 110 may implement communication pursuant to an Open System Interconnection (OSI) reference model. Communication links 114 may be implemented as fiber optic cables or conductive metal cables. Docking stations 112 may comprise, or be coupled to, one or more communication connection devices, e.g., routers or the like.

Figure 2:
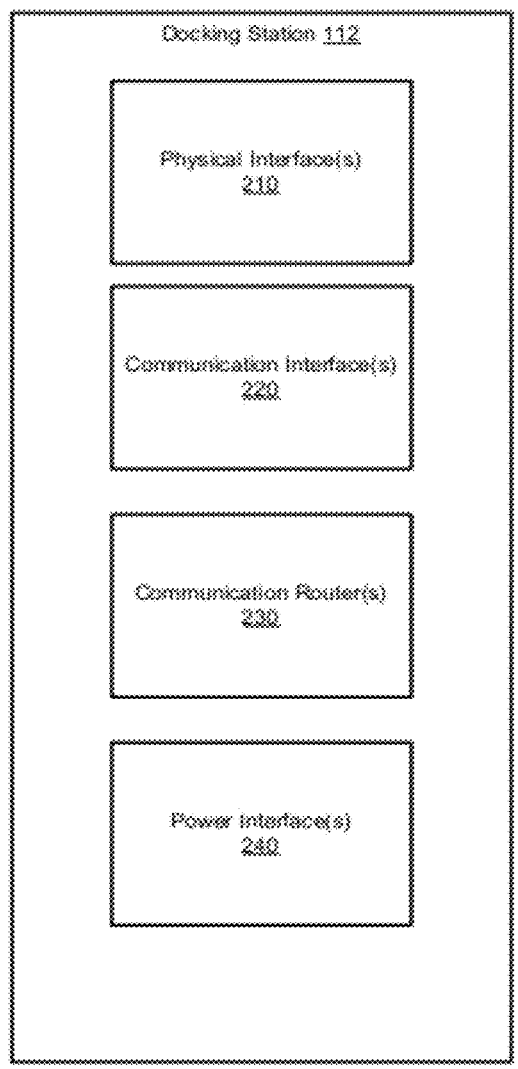
FIG. 2 is a schematic illustration of a docking station, according to embodiments.

FIG. 2 is a schematic illustration of a docking station 112, according to embodiments. Referring to FIG. 2, docking station 112 comprises one or more physical interfaces 210 to establish a physical connection with a submersible vehicle 130. In some embodiments the physical interface 210 may be implemented as a mechanical interface which selectively locks a submersible vehicle to the docking station 112.

Docking station 112 further comprises one or more communication interfaces 220, one or more communication routers 220, and one or more power interfaces. In one embodiment, docking station 112 comprises communication interface to communicate with a submersible vehicle 130. In some embodiments the communication interface 220 may be embodied as a wireless RF interface which operates at a frequency between approximately 1 Hz and 10 MHz, which is suitable for wireless communication over short distances underwater. One skilled in the art will recognize that a broad frequency range is available because the propagation distance is much longer at lower frequencies. In some embodiments the frequency would be in the MHz range for faster data transfer, but a lower frequency with a longer range could be used as a beacon to guide a vehicle into proximity that will sustain higher data rates. A docking station transponder may operate over a frequency range in response to a situation (i.e., high frequency when vehicle docked. Low frequency as vehicle moves out of proximity). Alternately, the communication interface 220 may be embodied as a wireless interface which utilizes radiation in the visible spectrum or the infrared spectrum. In other embodiments the communication interface may be implemented as wired connection, which may be established when the physical interface 210 establishes a connection between the docking station 112 and a submersible vehicle 130.

Docking station 112 further comprises one or more communication routers 230 to manage communication through the communication network 110. Again, the specific implementation of the router(s) 230 is not critical. In some embodiments the communication router 230 may be implemented as an Internet Protocol (IP) router.

Docking station 112 further comprises one or more power interfaces 240 to provide power to a submersible vehicle 130 coupled to the docking station 112. In some embodiments the communication network may comprise one or more power cables to carry electrical power to the docking station. An electrical connection may be established with the submersible vehicle 130 when the submersible vehicle 130 is docked with the docking station 112. In another embodiment the power interface 240 may provide power to a submersible vehicle 130 via an inductive coupling module.

Figure 3:
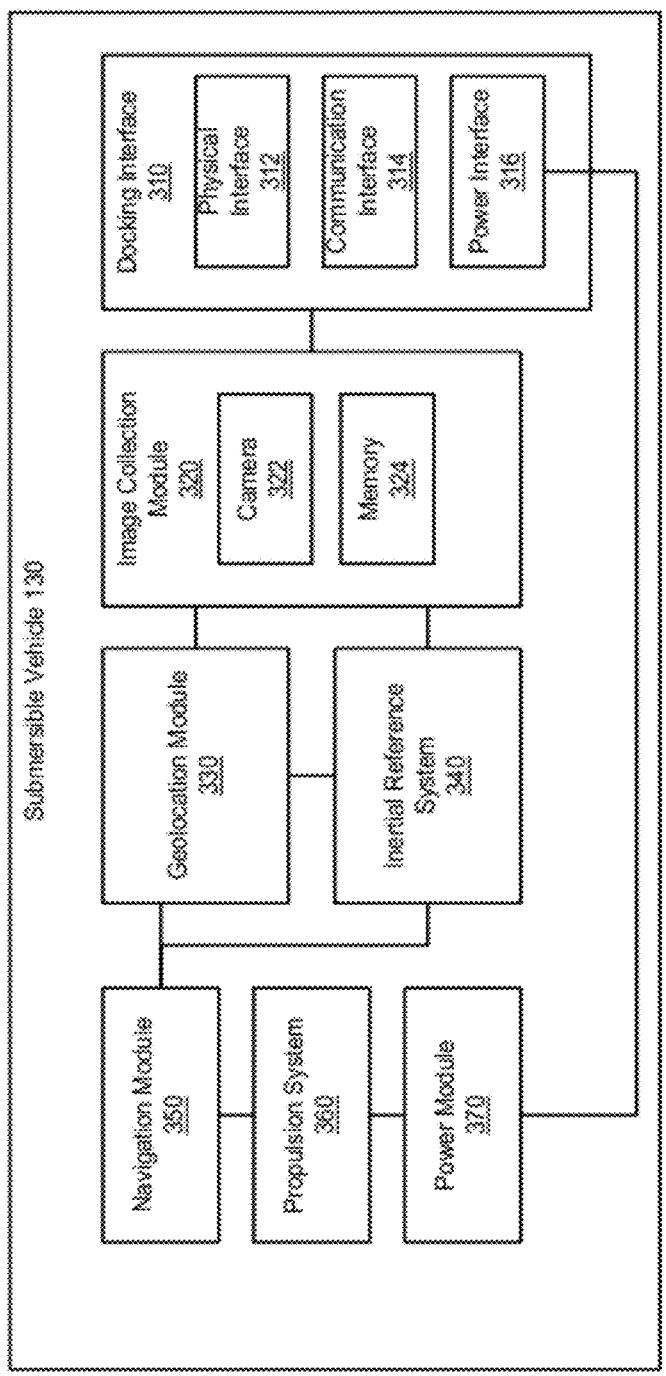
FIG. 3 is a schematic illustration of a submersible vehicle for autonomous underwater navigation, according to embodiments.

FIG. 3 is a schematic illustration of a submersible vehicle 130 for autonomous underwater navigation, according to embodiments. Referring to FIG. 3, submersible vehicle 130 comprises a docking interface 310, an image collection module 320, a geolocation module 330, an inertial reference system 340, a navigation system 350, propulsion system 360, and a power module 370.

Docking interface 310 comprises a physical interface 312, a communication interface 314, and a power interface 316. These modules may be designed to mate with the corresponding modules on the docking station 112. Thus, the physical interface 312 permits a physical connection with the physical interface 210 of the docking station 112. Similarly, the communication interface 314 permits a communication connection to be established with the communication interface 220 of the docking station 112, and the power interface 316 permits the submersible vehicle 130 to draw power from the power interface 240 of the docking station 112. The docking interface 310 and docking station 112 may be designed such that the submersible vehicle 130 is held stationary, allowing navigation module 350 and inertial reference system 340 to initialize (i.e., after periods of shut-down) with a gyrocompass alignment or another mechanism for orienting the system via sensed earth rate.

Image collection module 320 comprises a camera 322 to collect images of the region proximate the submersible vehicle 130 and a memory module 324 to store the images in a computer readable memory medium. The camera 322 may operate to collect images in a visible radiation wavelength, or to collect images in a wavelength outside the visible spectrum. Images from the camera may be stored in the memory 324.

Submersible vehicle 130 further comprises a geolocation module 330 and an inertial reference system 340. Geolocation module cooperates with an external geolocation system (e.g., the global positioning system (GPS) or the global satellite navigation system (GNSS)) to establish a location for the submersible vehicle with reference to a geolocation reference system such as WGS84. Inertial reference system 340 may comprise one or more gyroscopes and accelerometers and employ methods of strapdown or gimbaled inertial navigation to track movement of the submersible vehicle with reference to a known position such as a geolocation reference. In operation, the geolocation module 330 and the inertial reference system 340 may cooperate with the image collection module to provide a geolocation reference for images collected by the image collection module. Aspects of this process will be described in greater detail below.

Submersible vehicle 130 further comprises a navigation module 350 coupled to the geolocation module and the inertial reference system 340. Navigation system 350 may also be coupled to a propulsion system 360 and a power module 370. As will be described below, in some embodiments the navigation module maintains the navigation solution by accepting position data from feature identification performed on camera images and applying them as an update to the inertial reference system. Depth data may be provided to the navigation module for this purpose from pressure sensors on the vehicle. The navigation module may generate control signals processed by the propulsion system to guide the vehicle along a chosen course. In some embodiments it does this by assessing the assigned mission which may be provided by the master controller, choosing an optimal trajectory and generating the commands to guide the vehicle accordingly.

Submersible vehicle 200 may be embodied as an unmanned submersible vehicle. Propulsion system 360 may comprise one or more motors coupled to one or more propellers, jets, or the like to provide propulsion to the submersible vehicle. Power module 370 may be embodied as one or more battery packs or the like.

Figure 4:
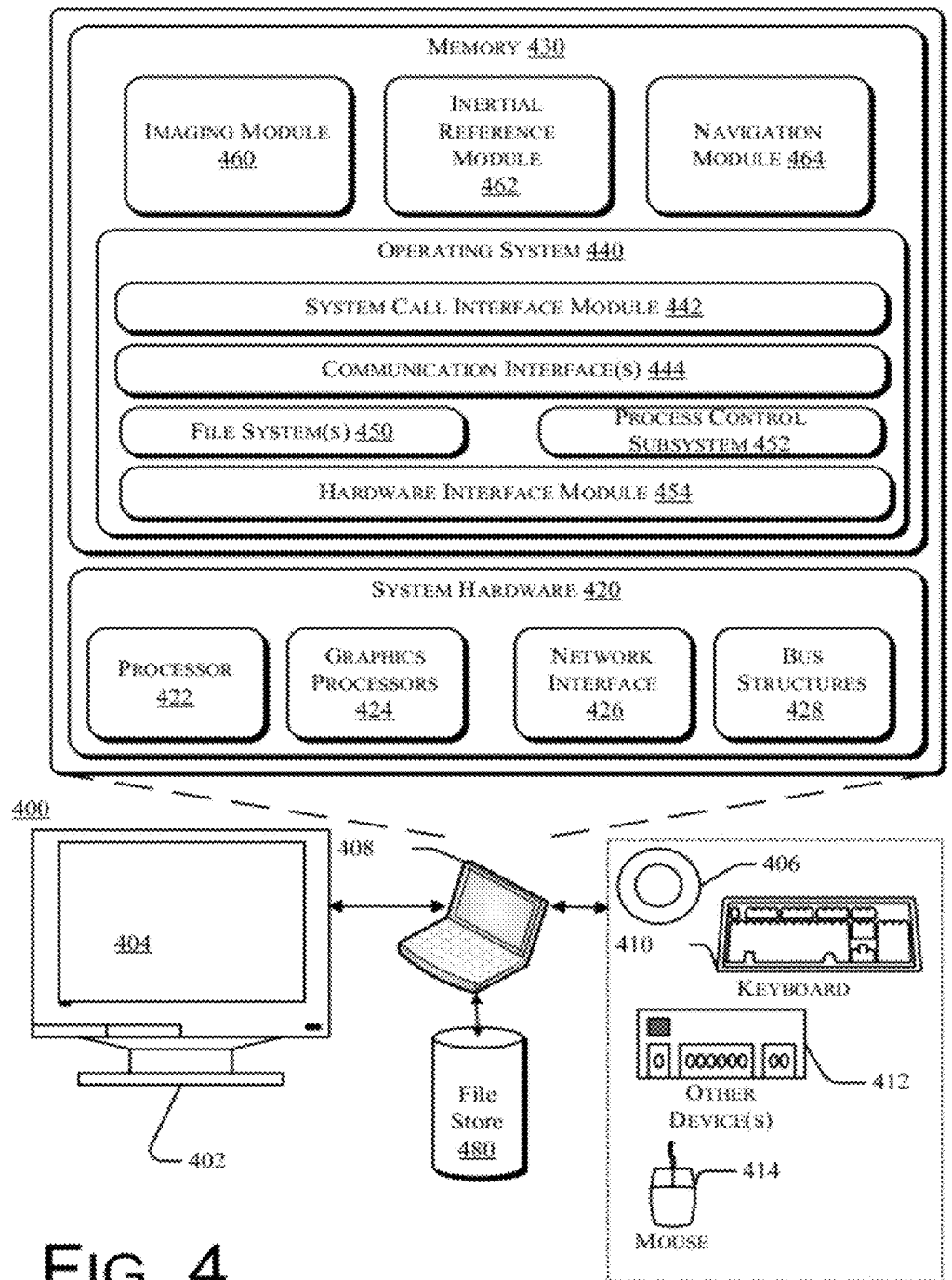
FIG. 4 is a schematic illustration of a computing device which may be adapted to implement an autonomous navigation system in accordance with some embodiments.

In some embodiments, various components of the submersible vehicle 130 may comprise, or may be implemented, as logic, which may be reduced to circuitry or implemented as logic instructions executable on a processing device. For example, a Global Satellite Navigation System receiver can now be implemented in software (apart from an antenna) that processes digitized signals. At the surface a processor implements a GNSS receiver, while underwater a different receiver embodiment may be used, one that processes lower radio frequency codes broadcast by wireless underwater transponders to accomplish a form of underwater pseudolite navigation. In one embodiment the processing device may be embodied as a general purpose computing device. FIG. 4 is a schematic illustration of a computing device which may be adapted to implement an autonomous navigation system in accordance with some embodiments. In one embodiment, system 400 includes a computing device 408 and one or more accompanying input/output devices including a display 402 having a screen 404, one or more speakers 406, a keyboard 410, one or more other I/O device(s) 412, and a mouse 414. The other I/O device(s) 412 may include a touch screen, a voice-activated input device, a track ball, and any other device that allows the system 400 to receive input from a user.

The computing device 408 includes system hardware 420 and memory 430, which may be implemented as random access memory and/or read-only memory. A file store 480 may be communicatively coupled to computing device 408. File store 480 may be internal to computing device 108 such as, e.g., one or more hard drives, CD-ROM drives, DVD-ROM drives, or other types of storage devices. File store 180 may also be external to computer 408 such as, e.g., one or more external hard drives, network attached storage, or a separate storage network.

System hardware 420 may include one or more processors 422, a graphics processor(s) 424, network interfaces 426, and bus structure(s) 428. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 424 may function as adjunct processors that manage graphics and/or video operations. Graphics processor(s) 424 may be integrated onto the motherboard of computing system 400 or may be coupled via an expansion slot on the motherboard.

In one embodiment, network interface 426 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 428 connect various components of system hardware 428. In one embodiment, bus structures 428 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 430 may include an operating system 440 for managing operations of computing device 408. In one embodiment, operating system 440 includes a hardware interface module 454 that provides an interface to system hardware 420. In addition, operating system 440 may include a file system 450 that manages files used in the operation of computing device 408 and a process control subsystem 452 that manages processes executing on computing device 408.

Operating system 440 may include (or manage) one or more communication interfaces that may operate in conjunction with system hardware 420 to transceive data packets and/or data streams from a remote source. Operating system 440 may further include a system call interface module 142 that provides an interface between the operating system 440 and one or more application modules resident in memory 130. Operating system 440 may be embodied as a Windows® brand operating system or as a UNIX operating system or any derivative thereof (e.g., Linux, Solaris, etc.), or other operating systems including real time operating systems such as QNX.

In one embodiment, memory 430 includes an imaging module 460, an inertial reference module 462, and a navigation module 466. These modules may correspond to the analogous modules depicted in FIG. 3. The respective modules 460, 462, 464 may include logic instructions encoded in a computer-readable medium which, when executed by processor 422, cause the processor 422 to perform the operations depicted in FIGS. 2-5 and using one or more of the user interfaces depicted in FIGS. 5-7.

Figure 5:
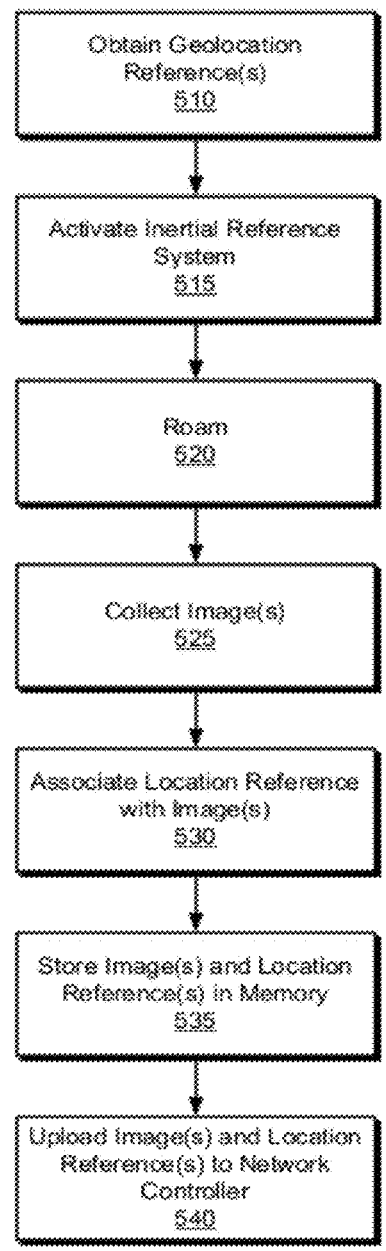
FIGS. 5-7 are flowcharts illustrating operations in methods for autonomous underwater navigation, according to embodiments.
Figure 6:
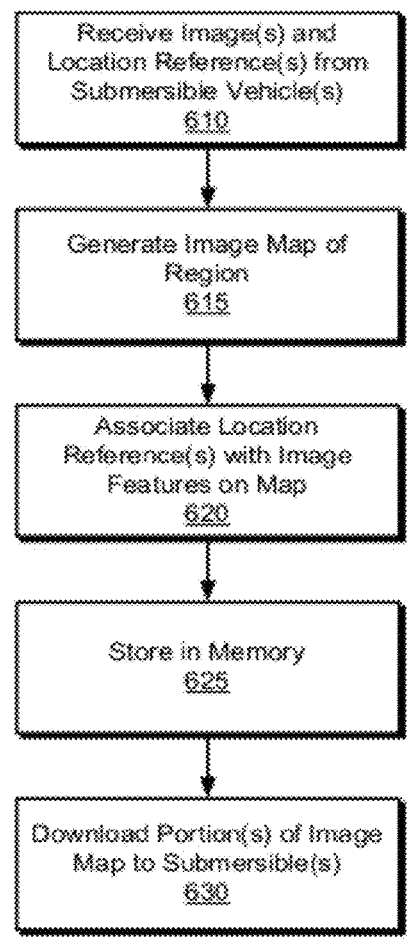
Figure 7:
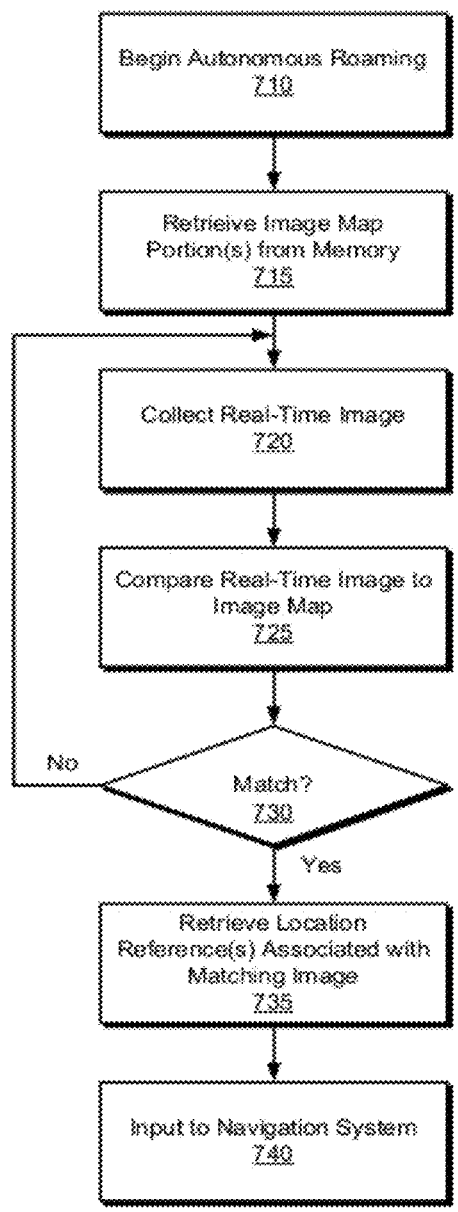

FIGS. 5-7 are flowcharts illustrating operations in methods for autonomous underwater navigation, according to embodiments. By way of overview, in one embodiment one or more submersible vehicles 130 may collect images from a region proximate a docking station and may use information from the geolocation module and the inertial reference system to associate geolocation information with the image(s). The images and the geolocation information may be used subsequently to allow the submersible vehicle to navigate autonomously by matching real-time imagery collected by the imaging system with stored images. When a match is located the location of the submersible vehicle may be estimated using the geolocation information associated with the matching image.

Referring first to FIG. 5, a method for the collection of images by a submersible vehicle is described. At operation 510 the geolocation module 330 of the submersible vehicle 130 obtains a geolocation reference. This may be accomplished by numerous mechanisms. In some embodiments the submersible vehicle 130 may obtain a geolocation reference from an external system such as a GPS system or a GNSS system before the submersible vehicle 130 is submerged. In other embodiments a geolocation reference may be established for the docking station 112 to which the submersible vehicle 130 is docked. For example, in some embodiments the geolocation process for the network grid takes place beginning in littoral areas where network cables enter the water. In this shallow environment the transfer of precise geolocation from surface Global Navigation Satellite Systems receiver data to underwater floor features can be accurately made. Once these initial underwater features have been geolocated they in turn can be used (in conjunction with GNSS data or in place of it) to keep the vehicle navigation solution accurate as it then images the next section of the grid floor features (for example, moving into deeper waters). Featureless areas can be augmented with markers permanently anchored as needed to provide an identifiable feature for geolocation.

At operation 515 the submersible vehicle 130 activates the inertial reference system 340, and at operation 520 the submersible vehicle may begin to roam in the water. As the submersible vehicle 130 is roaming the inertial reference system keeps track of the position of the submersible vehicle 130 relative to the location at which the inertial reference system was activated. Thus, when the inertial reference system 340 is activated at a known geolocation reference, the position of the submersible vehicle 130 may be estimated with respect to the known geolocation reference and thereafter maintained accurately through additional navigation updates provided as the vehicle passes geolocated features on the floor as it carries out its assigned mission.

At operation 525 the image collection module 320 of the submersible vehicle 130 collects images from the environment. By way of example, the camera 332 may collect images of distinct features in the underwater environment. At operation 530 a location reference is associated with the image. In some embodiments the location reference may represent an estimate of a current geolocation reference of the submersible vehicle, which may be estimated from the geolocation reference obtained in operation 510 and the information generated by the inertial reference system 340. In this process simultaneous localization and mapping algorithms or the like may be used in a view-based scan-matching approach that registers overlapped perceptual data to create spatial drift-free poses recognizable when the vehicle returns to a previously visited place.

At operation 535 the image(s) collected and the associated location references are stored in the memory module 324. After a period of roaming the submersible vehicle may return to the docking station 112. Optionally, at operation 540 the images and the associated location reference information may be up loaded to the master controller node 120 via the communication network 110. While the submersible vehicle 130 is docked at the docking station 112 the submersible vehicle may be recharged by coupling to the power interface 240 of the docking station.

FIG. 6 is a flowchart illustrating operations performed by the master controller node 120. In some embodiments the master controller 120 node receives (operation 610) images and location references (including estimated accuracy of image geolocation) from one or more submersible vehicles 130 roaming in regions proximate the communication network 110. At operation 615 the master controller node 120 generates an image map of the region using the images by assembling the image data received from the submersible vehicles 130. At operation 620 the master controller node 120 associates location references with image features on the map, and at operation 625 the map is stored in a memory module. The master controller node 120 may use stochastic estimation algorithms and image processing to extract the most accurate geolocation when multiple images of an area are available, cataloguing the images cross-referenced with geolocation.

At operation 630 the master controller node 120 may download portions of the image map to the one or more submersible vehicles 130. In one embodiment the master controller node 120 transmits the complete image map generated in operation 615 to the various docking stations on the network. In an alternate embodiment, the master controller node 120 transmits to the docking stations 112 only the portion of the map which represents the region surrounding the respective docking station 112 and may in addition transmit that portion of the map over which the vehicle is being tasked to navigate for a given mission. The docking station 112 can then transmit the portion of the map to a submersible vehicle 130 through the communication interface 210.

Once the submersible vehicle 130 has an image map of the region stored in its memory module 324, whether generated locally or at the master controller node 120, the submersible vehicle 130 can use the image map to navigate autonomously, i.e., without using an external location system. FIG. 7 is a flowchart illustrating operations used in autonomous underwater navigation. Referring to FIG. 7, at operation 710 the submersible vehicle begins autonomous roaming. At operation 715 one or more portions of an image map are retrieved from memory module 324. At operation 720 the submersible vehicle 130 collects real-time images from the region surrounding the submersible vehicle 130, e.g., using the image collection module 330.

At operation 725 the real-time image(s) are compared to the images in the image map. If, at operation 730, there are no matching images then control passes back to operation 720 and more real-time images are collected. By contrast, if one or more images in the image map match the real-time image, then control passes to operation 735 and the location reference(s) associated with the matching image are retrieved. At operation 740 the location reference(s) are input to the navigation module, which use the location reference(s) to navigate the submersible vehicle 130 autonomously. The location references provide an update to the inertial reference system 340, removing accumulated navigation error to enable long term accurate navigation. In the process of FIG. 7, image collection may be suspended until the vehicle reaches the location of a known geolocated feature and resumed at that point, thereby conserving battery power. The operations of FIG. 7 may be repeated continuously to permit the submersible vehicle 130 to navigate autonomously across an extended period of time and across the entire region covered by the image map. Imaging need only take place when updates to the navigation system are desired. That is, the camera may be shut down while the vehicle is in transit to a known feature, and turned on when in proximity to it thereby enabling a position update.

Thus, described herein are systems and methods to enable a submersible vehicle to implement autonomous underwater navigation. In brief, the system comprises one or more master controllers of an underwater grid of power and communications cables that may extend many miles out into an underwater area. These master controllers, which maybe abovewater, assimilate a geolocated image map which may comprise geolocated images and associated geolocation accuracy data, taken in different locations and under different operating conditions by multiple vehicles operating in the network grid area to collect the image data and send it back to the controller via network nodes. The network controller uses stochastic estimation and image processing techniques to assimilate an accurate map of the grid area that can then be used to task the vehicles docked at its nodes, for the purpose of having them perform a desired mission during which they will navigate autonomous using the provided geolocated image data. The vehicles use their optical cameras (e.g., illuminating a feature area with onboard strobe lighting) to identify features in passing and update the navigation system solution thereby keeping it accurate enough to satisfy the mission goals.

Users can interact with the system via one or more user interfaces with the master controller, to develop parameters for different segments of legs of an underwater mission for a particular vehicle in the grid. The data input via the user interface tasks the master controller to in turn assemble mission data and transmit it to the vehicle docked at a node, via communications cables and wireless interfaces.

The navigable network area may be extended over time through an ongoing geolocation process in which submersibles in the network are tasked to navigate out to features at the known network edge, update their navigation system, and then image a previous unexplored region of the underwater floor off the network edge. Featureless areas can be extended by installing permanently anchored markers on the floor in these areas, for imaging and geolocation by the submersibles. The method and process is that of FIG. 5, and the geolocation references are in this case the features at the known edge of the grid where exploration is to take place.

At periodic intervals the submersibles may require maintenance off grid and on land or master ship. The submersibles may be returned to the grid by a master ship (e.g., a surface ship, submarine or the like) using a low motion transfer alignment algorithm to quickly and accurately achieve initialization of the submersible's navigation system. A low motion transfer alignment algorithm may comprise a high rate Kalman filter processing position, velocity and attitude updates from a master ship, estimating the relative alignment of the slave ship (i.e., the submersible to be released) and transferring to the submersible an accurately initialized navigation system at release.

In the foregoing discussion, specific implementations of exemplary processes have been described, however, it should be understood that in alternate implementations, certain acts need not be performed in the order described above. In alternate embodiments, some acts may be modified, performed in a different order, or may be omitted entirely, depending on the circumstances. Moreover, in various alternate implementations, the acts described may be implemented by a computer, controller, processor, programmable device, firmware, or any other suitable device, and may be based on instructions stored on one or more computer-readable media or otherwise stored or programmed into such devices (e.g. including transmitting computer-readable instructions in real time to such devices). In the context of software, the acts described above may represent computer instructions that, when executed by one or more processors, perform the recited operations. In the event that computer-readable media are used, the computer-readable media can be any available media that can be accessed by a device to implement the instructions stored thereon.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A submersible vehicle for autonomous underwater navigation of at least a portion of a floor of a body of water, comprising:
   a geolocation module to establish a geographic reference for at least one location in the underwater geographic region; and
   an image collection module to collect images of an underwater geographic region proximate the geographic reference,
   wherein the submersible vehicle comprises a global positioning system (GPS) module to establish a geolocation reference.

2. The submersible vehicle of claim 1, further comprising an inertial reference system which uses inputs from the geolocation module to locate one or more features of an underwater geographic region.

3. The submersible vehicle of claim 2, wherein the inertial reference system comprises at least one of a gyroscope and an accelerometer.

4. The submersible vehicle of claim 2, further comprising a network interface module to establish a communication connection with an underwater network node, and wherein the inertial reference system establishes a geographic location reference using the underwater network node.

5. The submersible vehicle of claim 4, further comprising a power module to power the submersible vehicle, and a power charging module to charge the power module, and wherein the power charging module is inductively coupled to a power module in the underwater network node to charge the power module.

6. The submersible vehicle of claim 4, wherein:
   the image collection module captures a plurality of images of the portion of a floor of a body of water and transmits the images to a master controller via the underwater network node;
   the master controller generates a map of the portion of the floor of the underwater region from the plurality of images.

7. The submersible vehicle of claim 6, wherein the submersible vehicle:
   retrieves the map generated by the master controller; and
   uses the map to navigate in the body of water.

8. The submersible vehicle of claim 2, wherein the inertial reference system uses a global positioning system (GPS) signal to establish a geographic location.

9. The submersible vehicle of claim 2, wherein the inertial reference system uses a global satellite navigation system (GNSS) signal to establish a geographic location.

10. A system for autonomous underwater navigation, comprising:

a communication network;

at least one master controller node coupled to the communication network;

at least one network docking node coupled to the communication network; and at least one submersible vehicle to map at least a portion of a floor of a body of water, comprising:

a geolocation module to establish a geographic reference for at least one location in the underwater geographic region; and an image collection module to collect images of an underwater geographic region proximate the geographic reference.

11. The system of claim 10, wherein the submersible vehicle comprises a global positioning system (GPS) module to establish a geolocation reference.

12. The system of claim 11, wherein the submersible vehicle further comprises an inertial reference system which uses inputs from the geolocation module to locate one or more features of an underwater geographic region.

13. The system of claim 12, wherein the inertial reference system comprises a gyroscope.

14. The system of claim 12, wherein:

the at least one submersible vehicle comprises a network interface module to establish a communication connection with at least one underwater network node;

the inertial reference system establishes a geographic location reference using the underwater network node.

15. The system of claim 14, wherein:

the submersible vehicle comprises a power module to power the submersible vehicle and a power charging module to charge the power module; and the at least one network docking node comprises an inductive power module; and the power charging module is inductively coupled to the inductive power module in the underwater network node to charge the power module.

16. The system of claim 12, wherein the inertial reference system uses a global positioning system (GPS) signal to establish a geographic location.

17. The system of claim 12, wherein the inertial reference system uses a global satellite navigation system (GNSS) signal to establish a geographic location.

18. The system of claim 10, wherein:

the image collection module captures a plurality of images of the portion of a floor of a body of water and transmits the images to a master controller via at least one underwater network node;

the master controller generates a map of the portion of the floor of the underwater region from the plurality of images.

19. The system of claim 18, wherein the submersible vehicle:

retrieves the map generated by the master controller; and uses the map to navigate in the body of water.

20. A method of autonomous underwater navigation, comprising:

establishing a geographic reference for at least one location in an underwater geographic region;

collecting a plurality of images of an underwater geographic region proximate the geographic reference;

assigning geolocation references to the plurality of images;

developing a map of at least a portion of the underwater geographic region, wherein the map comprises at least a portion of the geolocation references; and using the map to navigate a submersible vehicle in an autonomous fashion.

\* \* \* \* \*